United States Patent
Lazic et al.

(10) Patent No.: US 7,367,740 B2
(45) Date of Patent: May 6, 2008

(54) MECHANICALLY LOCKABLE UNIVERSAL JOINT AND STRUCTURES EMPLOYING SUCH JOINT

(76) Inventors: Pedrag Lazic, 46738 W. Ridge Dr., Macomb, MI (US) 48044-3583; Michael J. Lassila, 1375 Rickett Rd., Brighton, MI (US) 48116

( * ) Notice: Subject to any disclaimer, the term of this patent is extended or adjusted under 35 U.S.C. 154(b) by 0 days.

(21) Appl. No.: 10/822,575

(22) Filed: Apr. 12, 2004

(65) Prior Publication Data

US 2004/0202506 A1    Oct. 14, 2004

Related U.S. Application Data

(60) Provisional application No. 60/514,488, filed on Oct. 24, 2003, provisional application No. 60/461,921, filed on Apr. 10, 2003.

(51) Int. Cl.
  *F16C 11/10* (2006.01)
  *F16M 11/00* (2006.01)
  *F21V 21/26* (2006.01)

(52) U.S. Cl. .................. 403/97; 403/103; 403/298; 403/359.1; 403/359.5; 248/125.1; 248/276.1

(58) Field of Classification Search ............. 403/97, 403/103, 298, 359.1, 359.5, 359.6; 362/427; 248/276.1, 125.1, 125.8, 125.9; 285/907
See application file for complete search history.

(56) References Cited

U.S. PATENT DOCUMENTS

| | | | |
|---|---|---|---|
| 641,118 A * | 1/1900 | Kelly .................. 403/217 |
| 1,382,783 A | 6/1921 | Howard | |
| 1,990,990 A | 2/1935 | Hathorn .................. 64/29 |
| 2,164,846 A * | 7/1939 | Thompson .............. 403/4 |
| 2,745,688 A * | 5/1956 | Farrington et al. ....... 403/73 |
| 2,921,773 A * | 1/1960 | Hoelzer .................. 403/103 |
| 3,990,550 A | 11/1976 | Recker .................. 192/46 |
| 4,021,017 A | 5/1977 | Adams .................. 254/8 |
| 4,145,124 A * | 3/1979 | Weisgerber ............. 403/161 |
| 4,491,435 A | 1/1985 | Meier .................. 403/55 |
| 4,548,446 A * | 10/1985 | Warshawsky ............ 403/97 |
| 4,572,291 A | 2/1986 | Robison .................. 166/173 |
| 4,577,827 A | 3/1986 | Eliscu .................. 248/656 |
| 4,582,445 A * | 4/1986 | Warshawsky ............ 403/97 |
| 4,718,151 A | 1/1988 | Le Vahn .................. 24/535 |
| 4,792,256 A | 12/1988 | Batchelor ............... 403/296 |
| 4,832,637 A | 5/1989 | Goluba .................. 440/83 |
| 5,056,805 A * | 10/1991 | Wang .................. 403/93 |
| 5,419,221 A * | 5/1995 | Cole .................. 81/60 |
| 5,641,191 A | 6/1997 | Jia .................. 276/97.6 |
| 5,664,750 A | 9/1997 | Cohen .................. 248/231.71 |
| 5,687,945 A | 11/1997 | Lee .................. 248/442.2 |

(Continued)

*Primary Examiner*—Daniel P. Stodola
*Assistant Examiner*—Ernesto Garcia
(74) *Attorney, Agent, or Firm*—Gifford, Krass, Sprinkle Anderson & Citkowsk

(57) ABSTRACT

An adjustable support stand for an article such as a camera employs a plurality of elongated links connected to one another at their ends by lockable universal joints. Each joint consists of a pair of complementary knuckles, each joined to a link end by a splined connection, which connections provide two axes of rotation to the joint. The knuckles are joined to one another about a third axis of rotation, perpendicular to the first two axes by means of a splined pin which passes through splined holes in the two knuckles. The splined connections employ splines of different count to achieve a high resolution of possible positions.

9 Claims, 3 Drawing Sheets

U.S. PATENT DOCUMENTS

| | | | |
|---|---|---|---|
| 5,775,184 A * | 7/1998 | Cole | 81/60 |
| 5,820,288 A * | 10/1998 | Cole | 403/97 |
| 5,876,005 A | 3/1999 | Vasconi | 248/276.1 |
| 5,937,881 A | 8/1999 | Villa | 135/20.1 |
| 5,961,527 A | 10/1999 | Whitmore, III | 606/130 |
| RE36,407 E * | 11/1999 | Rocco | 15/110 |
| 6,000,299 A * | 12/1999 | Cole | 81/60 |
| 6,045,292 A | 4/2000 | Placide | 403/359.3 |
| 6,079,682 A * | 6/2000 | Olkkola | 403/97 |
| 6,099,195 A | 8/2000 | Egner-Walter | 403/282 |
| 6,161,982 A * | 12/2000 | Cole | 403/97 |
| 6,168,126 B1 | 1/2001 | Stafford | 248/276.1 |
| 6,216,565 B1 * | 4/2001 | McCann | 403/97 |
| 6,220,556 B1 | 4/2001 | Sohrt | 248/279.1 |
| 6,540,188 B2 | 4/2003 | Jenkins | 248/276.1 |
| 6,619,872 B2 * | 9/2003 | Crorey et al. | 403/97 |
| 6,840,141 B2 * | 1/2005 | Cole | 403/97 |
| 2002/0182002 A1 | 12/2002 | Toelle | 403/359.1 |
| 2003/0017878 A1 | 1/2003 | Muju | 464/157 |

* cited by examiner

MECHANICALLY LOCKABLE UNIVERSAL JOINT AND STRUCTURES EMPLOYING SUCH JOINT

RELATED APPLICATION

This application claims priority of U.S. Provisional Patent Application Ser. No. 60/461,921 filed Apr. 10, 2003, and Provisional Patent Application Ser. No. 60/514,488 filed Oct. 24, 2003, which are incorporated herein by reference.

FIELD OF THE INVENTION

This invention relates to a mechanical joint for securing two structural elements in any of a wide variety of positional relationships, to a unique lock for such joints, and to structures employing such joints.

BACKGROUND OF THE INVENTION

A wide variety of mechanical devices employ universally adjustable joints for connecting two elements at a variety of positional relationships. For example, in optical apparatus it is often necessary to support an element, such as a camera or a laser, in a unique position relative to other elements and to be able to lock the joints which support the element to ensure maintenance of a chosen positional relationship. Similar jointed stands are often used in supporting medical apparatus, vehicle components, etc.

Often these supports include two or more elongated links or arms joined by universal joints so that the arms may be arrayed in any chosen relation with respect to one another. By way of example, U.S. Pat. No. 6,168,126 discloses a multi-adjustable stand for vehicle electronic components including a pair of arms and adjustable, lockable joints for securing the arms in any variety of positions relative to one another. U.S. Pat. No. 6,220,556 discloses a similar system for supporting switches above a base.

SUMMARY OF THE INVENTION

The present invention is directed to such universal joints and to adjustable support structures employing said joints. In a preferred embodiment of the invention, which will subsequently be disclosed in detail, each joint takes the form of a pair of complementary knuckles. Each knuckle is adapted to be supported at one end of an elongated strut or rod by means of a splined connection with the strut. The knuckle preferably employs a cylindrical member at one of its ends which is splined and fixed within a splined hole at the end of the strut. Alternatively, this relationship may be reversed with a splined cylinder extending from the end of the strut and joining in a female splined hole in the knuckle. These splined joints allow the rotational position of the knuckles relative to the links to be adjusted. A locking mechanism may secure the splined joint after adjustment.

The end of each knuckle which extends outwardly from the strut to which it is connected includes a splined hole extending generally perpendicularly to the rod axis. A pair of knuckles connected to two links may be joined by means of a splined pin which extends through both of the holes in the two knuckles. This allows the two knuckles to be adjusted about the rotational axis of the pin. Thus, three axes of adjustment are provided for the joint. The two splined connections which join the knuckles to the rod ends may each be individually rotationally adjusted, and the position of the two knuckles relative to one another may be similarly adjusted about an axis generally normal to the two rods or links.

Preferably, the female splines formed in a pair of complementary knuckles have different numbers of spline teeth to maximize the number of rotational orientations possible. It is advantageous if the two numbers of splines do not have a common denominator. For example, one spline may have thirty teeth and the other spline may have nineteen teeth. This allows 30×19 different rotational positions or a 0.6 degree rotational adjustment between the two knuckles.

The splined pin which joins the two knuckles has two splined sections of different diameter formed on its barrel and the splined holes formed in the two knuckles are of different diameter. The section of the splined pin adjacent to the head end is of larger diameter and the extending cylindrical section is of smaller diameter. When the pin is inserted into the knuckles to lock the two complementary knuckle sections into locking relationship, the smaller diameter section is passed through the knuckle with the larger diameter hole so that the extending section of the pin clears the splines and the extending section is then inserted into the smaller diameter splined hole in the second knuckle section so that the splines on the extending section of the pin engage the internal splines on the hole in the second knuckle. The larger diameter section of the pin adjacent to the head then engages the splines in the first knuckle section. The extending section is formed with splines complementary to the internal splines formed in the second section, and the larger diameter section on the pin is formed with splines complementary to the first knuckle section. In the example given the section adjacent to the head of the pin has a thirty-tooth spline and the extending section, of smaller diameter, has a nineteen-tooth spline. This allows the two knuckle sections to be rotationally adjusted relative to one another to a 0.6 degree rotational resolution.

In order to lock the two knuckles relative to one other, the knuckles preferably each have flat faces which are brought into mating contact with one another when the spline connection between the knuckles is locked. In order to achieve this lock, the hole in which the spline is formed on the complementary knuckles will be made at a slight angle, preferably around 1 degree, to perpendicular of the mating faces. In that way, when the knuckles are assembled by the pin there will be a slight angle between the mating surfaces. The far end of the pin has a threaded central hole and a bolt may be inserted into the hole to force the splines outwardly and lock the knuckles in their selected positional relationship. This locking force pushes the two flat mating faces of the complementary knuckle sections into contact with one another and forces the splines on the pin to preload removing any slack in the joint resulting from manufacturing tolerances.

In an alternative embodiment of the invention the knuckles may be joined to their supporting links by splined cylinders which extend from the ends of the links and fit into mating splined holes in the knuckle. In this form, the knuckle essentially consists of an L-shaped bracket with two splined holes, one in each face of the bracket.

The support stands formed using these universal joints may employ a flat base member which may be secured to a supporting surface so that the stand extends generally normally to that surface. The link at the other end of the support stand may employ a universal joint which secures the supported apparatus such as a camera or laser.

Other objects, advantages and applications of the present invention will be made apparent by the following detailed description of preferred embodiments of the invention. The description makes reference to the accompanying drawings in which:

DETAILED DESCRIPTION OF THE PREFERRED EMBODIMENTS OF THE INVENTION

Figure 1:
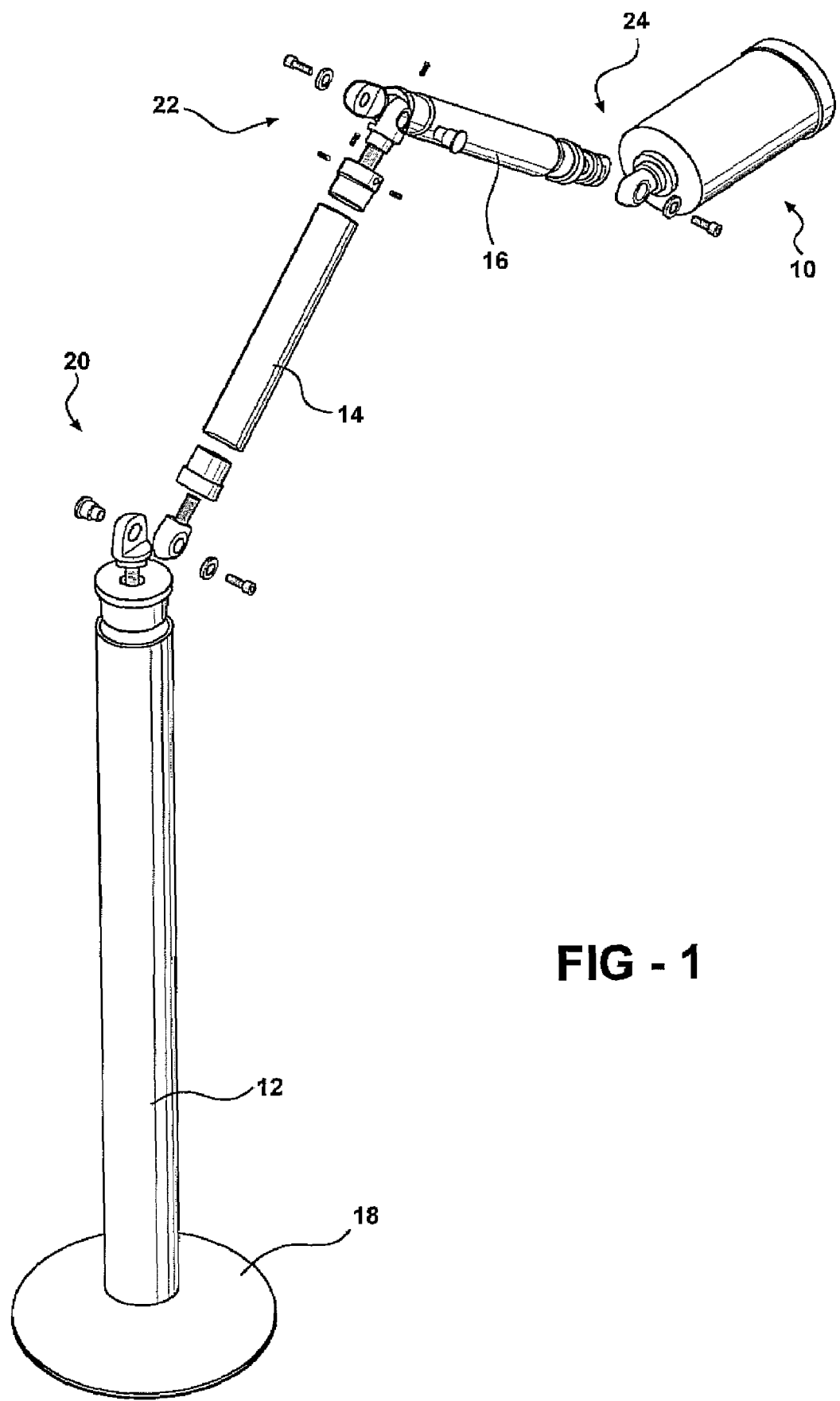
FIG. 1 is an exploded perspective view of a support stand for a camera employing three elongated links joined by universal joints.

A preferred embodiment of the invention is illustrated in exploded form in FIG. 1. This embodiment is employed to support a camera 10 in a selected position above a supporting surface. It should be understood that a wide variety of other devices which must be securely supported and aligned may be used with the stand. The stand preferably employs three links 12, 14 and 16, formed by tubes, preferably steel, aluminum or composite material. One end of the tubular link 12 is secured to a base member 18 which may be weighted, or attached to a supporting surface by fasteners so that the tubular link 12 extends generally vertically to the supporting surface, although, in alternative embodiments the support surface need not be horizontal and the supported link may extend at any angle to the support surface.

The upper end of the tubular link 12 is joined to one end of the second tubular link 14 by a splined universal joint, generally indicated at 22, while the opposite end of the second tubular link 14 is connected to one end of the third tubular link 16 by an identical universal joint generally indicated at 20. A similar universal joint, generally indicated at 24, secures the opposite end of the third tubular link 16 to the camera 10. In practice, the splined universal joints could be used to form a stand with one or more links.

Figure 2:
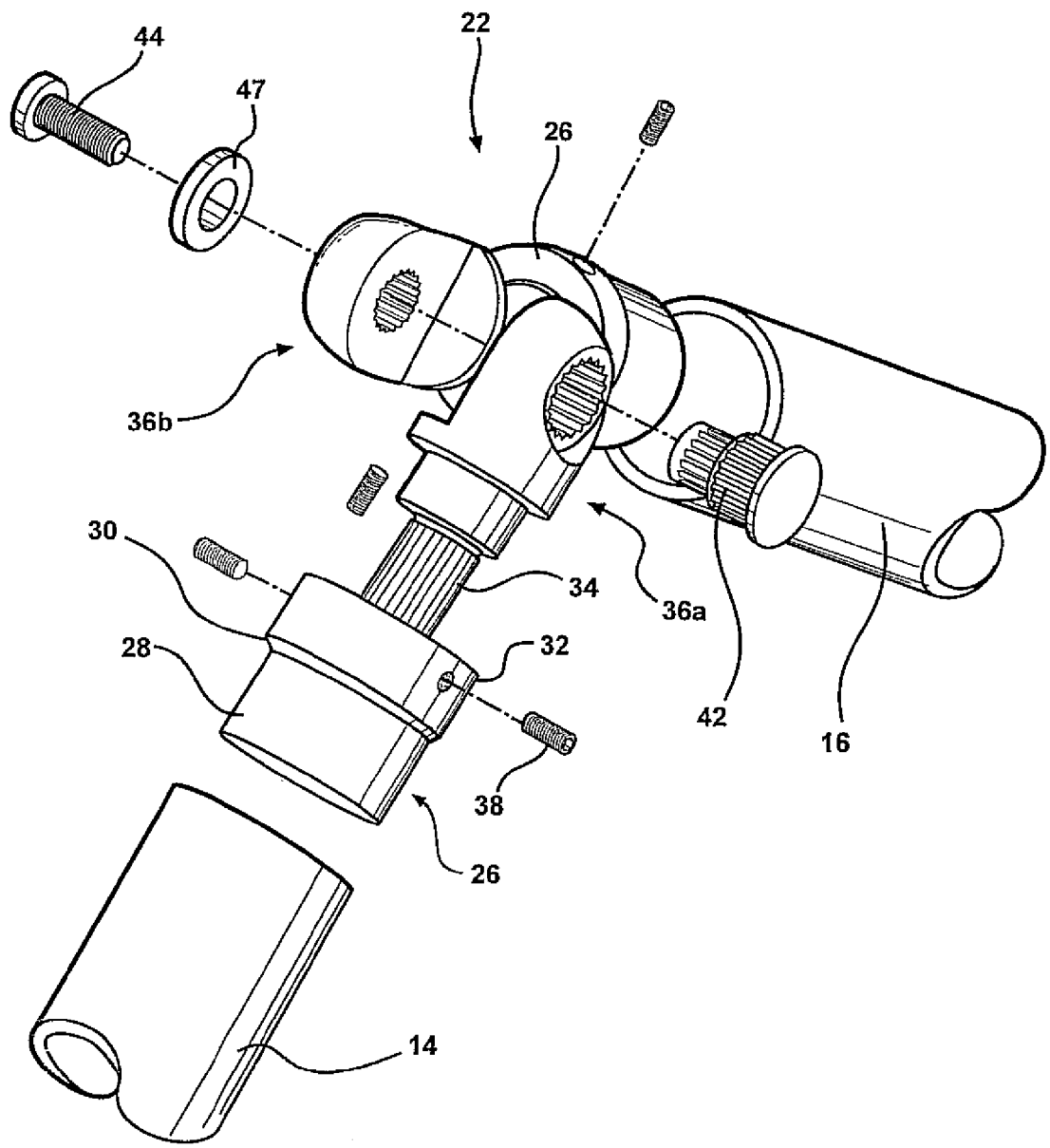
FIG. 2 is a detailed perspective view of one of the universal joints in exploded form.

A detailed view of the splined universal joints 20 and 22 is illustrated in FIG. 2. The joint illustrated joins the tubular link 12 to the tubular link 14. The joint 22 is identical and the joint 24 is very similar. The joined ends of the linked tubes 12 and 14 terminate in identical end caps 26. The end caps include a small diameter cylindrical section 28 having an outer diameter which makes a press fit with the internal diameter of the tube and is secured in the tube 12 by welding or the like. A shoulder 30 joins the section 28 to a larger diameter end section 32 and bears against the end of its associated tube. The end caps 26 have central splined holes which receive the splines 34 of a knuckle 36a or a complementary knuckle 36b. A locking pin 38 extending through a threaded hole in the end cap 26 secures the spline member 34 in a unique position. This spline connection provides a first axis of rotational adjustment for the support stand.

The spline 34 is formed in a unitary manner, or alternatively securely joined, with an end section of the knuckle 36a which has a central splined internal hole with its axis extending generally normally, or at a slight angle to the normal, to the axis of the splines section 34.

A complementary knuckle 36a is adjustably supported in the end cap 26 at the end of the tube 14 and the two end sections 40a, 40b. This mechanism provides a second axis of adjustment. The rotational position of the a first cylindrical part 34a, 34b having axially extended splines inserted into a hole 29a with internal splines within a second part 28a, 28b of the end cap 26, 26a, 26b of the tubes 14, 16 provides a third axis of adjustment. The first cylindrical part 34a, 34b and the second part 28a, 28b comprise a splined member or a structure thus there being a pair of splined members or structures at each universal joint.

In a preferred embodiment of the invention the splined pin has a central Threaded hole. A screw 44 passing through a washer 47 may be inserted into the central hole of the pin 42 to axially spread the pin and lock the exterior splines of the pin 42 to the interior splines in the two members 40.

Figure 3:
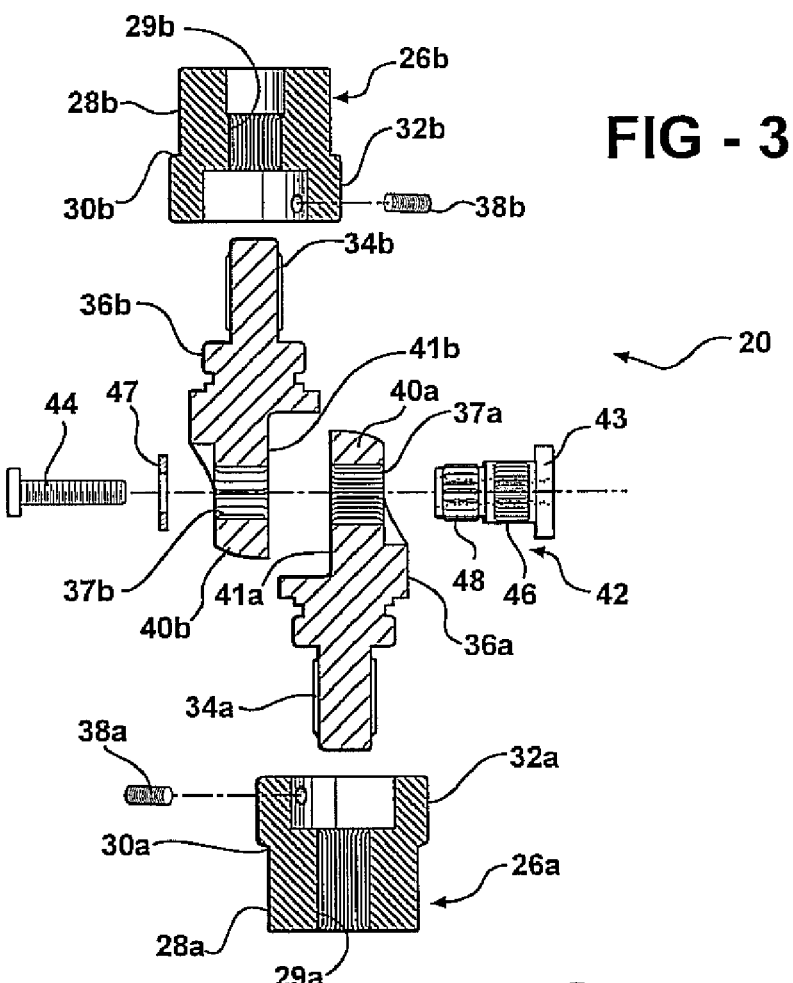
FIG. 3 is a cross-sectional view, in exploded form, of one of the universal joints.

Referring to FIG. 3, the knuckled joint is illustrated in exploded cross section and in more detail. In this view the components of the lower knuckle section are denominated with the suffix "a" and the components of the upper knuckle section are denoted with the suffix "b". The end cap 26a has a central splined aperture 29a formed with a thirty-tooth spline to receive the thirty-tooth spline on the knuckle member 34a. Similarly, the internal aperture 29b of the end cap 26b has a nineteen-tooth internal spline to accommodate the nineteen-tooth spline on the knuckle section 34b. These spline selections, or alternative spline selections in which the two splines do not have a common denominator, allows adjustment of the rotational position of the strut 12 relative to the strut 14 with a resolution of at least 0.6 degrees.

The knuckle 36a has a central splined hole 37a which is of slightly larger diameter than a similar splined hole 37b formed in the knuckle 36b. The pin 42 has a head 43 and a splined cylinder 46 of relatively large diameter arranged immediately adjacent to the head. Beyond the section 46 a smaller diameter section 48 projects. Pin section 48 has a central threaded hole adapted to receive a threaded bolt 44 for locking purposes. The section 46 has a spline count of thirty as does the larger hole 37a in the knuckle 36a. The smaller diameter section 48 has a spline count of nineteen as does the internal spline formed in the section 37b of the knuckle 36b.

The joint is locked by passing the pin 42 first through the spline section 37a so that the larger diameter section of the pin 46 engages that spline, and the smaller diameter end section of the pin 48 engages the splined hole 37b in the knuckle section 36b. The difference in the number of splines in the two knuckles allows the two knuckles to be angularly adjusted with respect to one another within a resolution of 0.6 degrees.

The splined hole 29a in the end cap 26a is preferably formed at a one-half degree angle from perpendicular to the center line of the upper face of the end cap as is the hole 29b in the end cap 26b. Similarly, the two splined holes 37a and 37b on the two knuckle sections are each offset by a half degree with respect to the center line. The joint is locked together by screwing the bolt 44 into the tapped end of the pin 42. This forces the two flat faces 41a and 41b of the two knuckle sections into locking engagement and loads the pin to lock the entire universal joint in fixed position.

Figure 4:
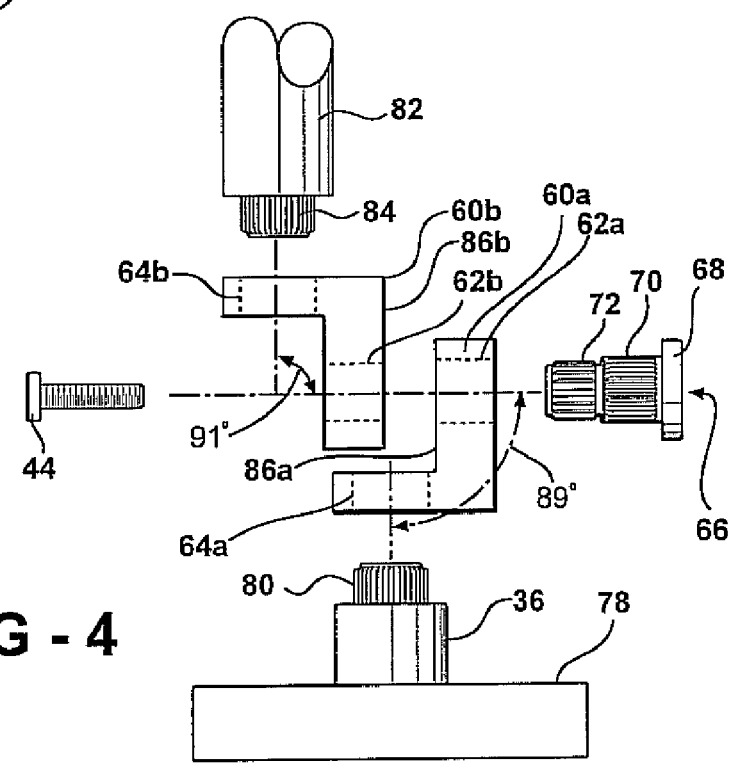
FIG. 4 is an exploded view of an alternative form of the joints wherein the knuckles simply consist of L-shaped elements having splined apertures in each face.

FIG. 4 illustrates an alternative form of the invention wherein two knuckle sections 60a and 60b simply comprise L-shaped brackets with central splined holes. The bracket 60a has a splined hole 62a in one of its faces and a splined hole 64a in its other face. The aperture 62a preferably has a thirty-tooth spline as does the aperture 64a. The two apertures are formed with an 89 degree included angle between their center lines.

Similarly, the knuckle section 60b is formed with two splined apertures 62b and 64b in its two arms. There is preferably a 91 degree included angle between the center lines of these two apertures. Both of the apertures are preferably formed with a nineteen-tooth spline.

A locking pin, generally indicated at 66, has a head 68, a large diameter thirty-tooth splined cylindrical section 70 adjacent the head, and an extending, smaller diameter nineteen-tooth spline section 72. The section 72 is formed with a central threaded aperture (not shown) which can be locked in with the bolt 44 and a washer.

The joint of FIG. 4 secures a strut 76, supported on a base 78 and having an extended splined cylinder 80 to a second strut 82 which has a cylindrical splined end extending section 84. The spline 80 preferably has thirty teeth and the spline 84 has nineteen teeth. The universal joint of FIG. 4 is locked by passing the pin 66 through the spline section 62a so that the larger diameter spline section 70 in the pin engages the interior spline section 62a. Then the extending section 72 of the pin is locked to the interior splined hole 62b. The spline cylinder 80 attached to the strut 76 is adjusted within the splined aperture 64a and the cylindrical spline section 84 is adjusted within the aperture 64b.

A threaded bolt 44 and washer are then engaged in the threaded aperture in the end of the pin to force the two opposing faces 86a and 86b of the two knuckles into intimate engagement. This loads the pin and the two splined cylinders 80 and 84 because of the offsets between their center lines, removing all tolerances from the universal joint.

The supports and stands formed in accordance with the present invention are useful in situations where flexibility and adjustability are necessary at the time of the installation but, once the proper position is attained, the support must stay at the exact location for the duration of the application.

The present invention eliminates the possibility of readjustment of the stand without extensive use of tools.

One skilled in the art should understand that the stand or support could take many forms involving one or more links and one or more universal joints.

We claim:

1. A positionally adjustable mechanism, comprising:
a pair of elongated members each having a central axis;
a base member fixed to a first end of one of the elongated members;
an article to be supported fixed to a first end of the other elongated member;
a pair of knuckles, each knuckle having an internally splined central hole;
a cylindrical pin formed with axially extending splines adapted to be inserted through said internally splined holes of the two knuckles;
a pair of structures each joining one of the knuckles to a second end of one of the elongated members so that the internally splined central hole of the knuckle extends substantially normal to the central axis of its connected elongated member, each such structure comprising a first cylindrical part having axially extending splines and a second part having a hole with internal spines, thereby allowing control of the rotational position of the first and second parts relative to one another, with the central axis of the cylindrical part and the hole being coaxial with the central axis of the connected elongated member and substantially normal to said cylindrical pin;
whereby, the orientation of the pair of elongated members relative to one another may be adjusted and fixed.

2. The adjustable mechanism of claim 1 wherein each knuckle has a planar face and its internally splined central hole is formed about an axis substantially perpendicular to the planar face, whereby the means for locking the pin in the two holes forces the planar faces of the two knuckles into abutment with one another.

3. The adjustable mechanism of claim 2 wherein at least one of the internally splined central holes which is formed substantially perpendicular to the planar face of its knuckle is angled with respect to the said planar face so that the action of locking the pin in the holes stresses the pin.

4. The adjustable mechanism of claim 1 wherein the internally splined central holes in the two knuckles are formed with different numbers of splines, the two numbers not having a common denominator, and the cylindrical pin has a head end, a first cylindrical section of larger diameter joined to the head end and formed with said axially extending splines, and a second cylindrical section of smaller diameter joined to the end of the first cylindrical section also formed with said axially extending splines, the two cylindrical sections being formed with different counts of splines, corresponding to the counts of the splines in the first and second splined central holes of the knuckles, whereby the rotational position of the knuckles may be adjusted to a resolution which represents a multiple of the two spline counts.

5. The adjustable mechanism of claim 4 wherein the angular relationship between the central hole in each of the knuckles and the center line of the splined connection between the knuckle and its associated member deviates from perpendicular, whereby upon locking the pin in the two members both the splined connection between the knuckles and their associated members and the pin connection between the two knuckles are stressed.

6. An adjustable position support stand for an article, comprising:
a pair of elongated members each having a central axis, comprising a first member and a second member;
a base for securing a first end of the first of said members to a supporting structure;
means for fixing said article to a first end of the second of said members; and
an adjustable joint for fixing the second ends of each of the pair of members to one another in a chosen positional relationship, said joint comprising:
a pair of knuckle sections, each attached to one of said members, each knuckle section having an internally splined central hole;
a cylindrical pin formed with axially extending spines adapted to be inserted through the internally splined holes of the two knuckle sections;
means for locking the pin in the holes to thereby fix the positional relationship of the two knuckle sections and their attached members; and
a pair of splined members each joining one of the knuckle sections to one of the elongated members so that the internally splined central hole of the knuckle sections extends substantially normal to the central axis of its connected elongated member, each such splined member comprising a first cylindrical part having axially extending splines and a second part having a hole with internal splines, the first part being adapted to be inserted into the hole in the second part to control the rotational position of the first and second parts, with the central axis of the cylindrical part and the hole being coaxial with the central axis of the connected elongated member and substantially normal to said cylindrical pin.

7. The adjustable position support stand of claim 6 wherein each knuckle has a planar face and the internally splined central hole of each knuckle is formed about an axis substantially perpendicular to the planar face, whereby said means for locking the pin in the holes to thereby fix the positional relationship of the two knuckles and their attached links forces said two planar faces of the two knuckles into engagement with one another.

8. The adjustable position support stand of claim 7 wherein at least one of the internally splined central holes is formed at an angle that deviates from the perpendicular to the planar face, whereby said means for locking the pin in the holes to thereby fix the positional relationship of the two knuckles and their attached members, bringing the planar faces into abutment with one another, prestresses the cylindrical pin.

9. The adjustable position support stand of claim 6 wherein the central holes formed in the two knuckles have different diameters and the splines formed in the central holes have a different spline count, without a common denominator to the two spline counts, and the cylindrical pin comprises a head, a first large diameter section extending from the head, and a second, smaller diameter section extending from the end of the first cylindrical section, the pin being adapted to pass through the central hole in one knuckle and then through the central hole in the other knuckle, and the two cylindrical sections of the pin having spline counts which correspond with the spline counts of the central holes in which the two cylindrical sections of the pin fit.

\* \* \* \* \*